US010354170B2

(12) United States Patent
Fu et al.

(10) Patent No.: US 10,354,170 B2
(45) Date of Patent: Jul. 16, 2019

(54) METHOD AND APPARATUS OF ESTABLISHING IMAGE SEARCH RELEVANCE PREDICTION MODEL, AND IMAGE SEARCH METHOD AND APPARATUS

(71) Applicant: Baidu Online Network Technology (Beijing) Co., Ltd., Beijing (CN)

(72) Inventors: Libo Fu, Beijing (CN); Heng Luo, Beijing (CN); Gaolin Fang, Beijing (CN); Wei Xu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 186 days.

(21) Appl. No.: 15/281,198

(22) Filed: Sep. 30, 2016

(65) Prior Publication Data

US 2017/0330054 A1 Nov. 16, 2017

(30) Foreign Application Priority Data

May 10, 2016 (CN) .......................... 2016 1 0306220

(51) Int. Cl.
*G06K 9/62* (2006.01)
*G06F 16/56* (2019.01)
(Continued)

(52) U.S. Cl.
CPC .......... *G06K 9/6257* (2013.01); *G06F 16/56* (2019.01); *G06F 16/9535* (2019.01); *G06K 9/66* (2013.01);
(Continued)

(58) Field of Classification Search
CPC .......... G06K 9/6257; G06K 9/66; G06N 3/08; G06N 3/0472; G06F 17/30271; G06F 17/30867
See application file for complete search history.

(56) References Cited

U.S. PATENT DOCUMENTS

| 2006/0112095 | A1* | 5/2006 | Xie | ................... | G06F 17/30029 |
| 2016/0358024 | A1* | 12/2016 | Krishnakumar | ... | G06K 9/00624 |
| 2017/0103338 | A1* | 4/2017 | Zhang | ................. | G06N 99/005 |

FOREIGN PATENT DOCUMENTS

CN 104317834 A 1/2015

OTHER PUBLICATIONS

Bai (Jun. 2014) "Dissertation for the Master Degree in Engineering on Research and Improvement on Deep Neural Network Based Object Recognition," Harbin Institute of Technology, School of Computer Science and Technology, 63 pp. [with English Abstract].

* cited by examiner

*Primary Examiner* — Qian Yang
(74) *Attorney, Agent, or Firm* — Lathrop Gage LLP

(57) ABSTRACT

Embodiments of the present invention disclose a method and an apparatus of establishing an image search relevance prediction model, and an image search method and apparatus. The method of establishing an image search relevance prediction model comprises: training a pre-constructed original deep neural network by using a training sample, wherein the training sample comprises: a query and image data, and the original deep neural network comprises: a representation vector generation network and a relevance calculation network; and using the trained original deep neural network as the image search relevance prediction model. The technical solution of the present invention optimizes the existing image search technology, and has stronger capabilities than the prior art as well as various (Continued)

integrations and variations in terms of semantic matching between a query and an image text, semantic matching between a query and image content, click generalization and the like.

18 Claims, 5 Drawing Sheets

(51) Int. Cl.
*G06F 16/9535* (2019.01)
*G06K 9/66* (2006.01)
*G06N 3/04* (2006.01)
*G06N 3/08* (2006.01)

(52) U.S. Cl.
CPC ......... *G06N 3/0454* (2013.01); *G06N 3/0472* (2013.01); *G06N 3/08* (2013.01)

METHOD AND APPARATUS OF ESTABLISHING IMAGE SEARCH RELEVANCE PREDICTION MODEL, AND IMAGE SEARCH METHOD AND APPARATUS

CROSS-REFERENCE TO RELATED APPLICATION

This application is related to and claims priority from Chinese Application No. 201610306220.6, filed on May 10, 2016, entitled "METHOD AND APPARATUS OF ESTABLISHING IMAGE SEARCH RELEVANCE PREDICTION MODEL, AND IMAGE SEARCH METHOD AND APPARATUS," the entire disclosure of which is hereby incorporated by reference.

TECHNICAL FIELD

Embodiments of the present invention relate to information processing technologies, in particular, to a method and an apparatus for establishing an image search relevance prediction model, and an image search method and apparatus.

BACKGROUND

Image search refers to an information retrieval process whereby a user enters a natural language query, for example, a query entered via a text field provided by a search engine; an image collection is searched and a sorted image result according to relevance and other parameters is returned. The relevance is one of the major performance parameters of a search engine, and measures the degree of relevance between a returned result and a user's query need. Images returned by an image search engine are in a structure-less pixel format, while queries entered by the user are in a text format. These two completely different information formats cannot be put into computation directly.

Currently, relevance characteristics of image search are described mainly using the following three approaches: 1. a text matching characteristic, which is obtained by comparing image surrounding text with a query; 2. a classification matching characteristic, which is obtained by comparing a classification label with the query, the classification label is obtained by classifying image content; and 3. a click-through rate characteristic, which is a measure of relevance between a specific image and the query obtained by conducting statistics on click behaviors and the like of a large number of user queries.

The above three methods for describing a relevance characteristic of image search all have limitations:

For the characteristic text matching characteristic: the surrounding text of the image may be inconsistent with the image content, and cannot completely and accurately describe the content of the image in many cases, thus affecting the accuracy of the text matching characteristic.

The classification matching characteristic is limited by the integrity of a category system and the correctness of a classification model. Generally, the finer the category system is, the more difficult is the classification, the less accurate becomes the classification model, the more semantically deviated from the query text is the classification result, and the more difficult matching becomes. However, if the category system is too rough, the matching with the query is not precise enough. Therefore, this characteristic generally only plays an auxiliary role.

The click-through rate characteristic is mainly based on user behavior statistics, has biases and noises on one hand, and sparsity on the other hand. Sufficient click statistics can only be collected from images presented at the top and with sufficient occurrences after frequent queries, while in other cases, no click statistics can be collected, or clicks are very sparse and lack statistical significance.

SUMMARY

Accordingly, embodiments of the present invention provide a establishment of an image search relevance prediction model, and an image search method and apparatus, to optimize an existing image search technology, and improve relevance between an image search result and a query entered by a user.

In the first aspect, an embodiment of the present invention provides a method for establishing an image search relevance prediction model, comprising:

training a pre-constructed original deep neural network by using a training sample;

wherein the training sample comprises: a query and image data, and the original deep neural network comprises: a representation vector generation network and a relevance calculation network, the representation vector generation network is used to convert different types of data in the training sample into representation vectors and input the representation vectors to the relevance calculation network, and the relevance calculation network is used to convert at least two input representation vectors into a relevance metric value; and using the trained original deep neural network as the image search relevance prediction model.

In the second aspect, an embodiment of the present invention provides a method for searching an image, comprising:

acquiring an image query entered by a user;

inputting separately the image query and to-be-sorted images into the image search relevance prediction model established by using the method for establishing an image search relevance prediction model described in the embodiment of the present invention, and calculating separately a relevance metric value between each of the to-be-sorted images and the image query; and sorting the to-be-sorted images according to the calculated relevance metric values, and providing an image search result corresponding to the sorting result to the user.

In the third aspect, an embodiment of the present invention provides an apparatus for establishing an image search relevance prediction model, comprising:

a training module, configured to train a pre-constructed original deep neural network by using a training sample;

wherein the training sample comprises: a query and image data, and the original deep neural network comprises: a representation vector generation network and a relevance calculation network, the representation vector generation network is used to convert different types of data in the training sample into representation vectors and input the representation vectors to the relevance calculation network, and the relevance calculation network is used to convert at least two input representation vectors into a relevance metric value; and a model generation module, configured to use the trained original deep neural network as the image search relevance prediction model.

In the fourth aspect, an embodiment of the present invention provides an image search apparatus, comprising:
an image query acquisition module, configured to acquire an image query entered by a user;
a relevance metric value calculation module, configured to separately input the image query and to-be-sorted images into the image search relevance prediction model established by using the apparatus of establishing an image search relevance prediction model described in the embodiment of the present invention, and separately calculate a relevance metric value between each of the to-be-sorted images and the image query; and
an image search result providing module, configured to sort the to-be-sorted images according to the calculated relevance metric values, and provide an image search result corresponding to the sorting result to the user.

In the embodiments of the present invention, an original deep neural network is constructed first, wherein inputs of the original deep neural network are a query and image data, and an output thereof is a relevance metric value between the query and the image data. Appropriate training samples are selected to train the original deep neural network, and finally, the original deep neural network may be trained into an image search relevance prediction model. After an image search engine receives an image query entered by a user, the image query and to-be-sorted images are input to the image search relevance prediction model to obtain relevance metric values between the to-be-sorted images and the image query. Then, the to-be-sorted images are sorted based on the relevance metric values, and the sorting result is returned to the user. The present invention optimizes the existing image search technology, and has stronger capabilities than the prior art as well as various integrations and variations in terms of semantic matching between a query and an image text, semantic matching between a query and image content, click generalization and the like. Moreover, the degree of relevance between an image search result and a query entered by a user can be greatly improved.

DETAILED DESCRIPTION OF EXEMPLIFIED EMBODIMENTS

Figure 1:
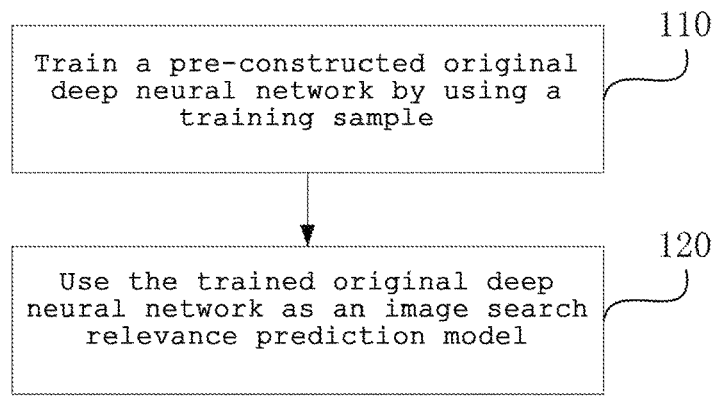
FIG. 1 is a flowchart of a method for establishing an image search relevance prediction model according to a first embodiment of the present invention.

To make the objectives, technical solutions, and advantages of the present invention clearer, the following describes the specific embodiments of the present invention in detail with reference to the accompanying drawings. It can be understood that, the specific embodiments described herein are merely used to illustrate the present invention rather than limiting the present invention.

In addition, it should be noted that, for ease of description, only part of rather than all of content related to the present invention is shown in the accompanying drawings. Before further detailed discussion of the exemplary embodiments, it should be noted that, some exemplary embodiments can be described as a process or method that is depicted as a flowchart. Although a flowchart can describe the operations (or steps) as a sequential process, many of the operations can be performed in parallel, concurrently or simultaneously. In addition, the order of the operations can be rearranged. The process can be terminated when its operations are completed. However, the process may further involve additional steps not comprised in the accompanying drawings. The process may correspond to a method, a function, a routine, a subroutine, and the like.

To clearly describe the content of the embodiments of the present invention, the inventive concept of the present invention is emphatically described first.

As described above, in the three manners for describing a relevance characteristic of image search introduced in the background, relevance between an image and a query is not calculated directly on the basis of image content; instead, the relevance between the image and the queryquery is calculated according to characteristics indirectly associated with a surrounding text of the image, a class of the image, a click-through rate of the image, and the like. In contrast, in the present application, the inventor creatively proposed that: the objective of conducting image search for a queryquery entered by a user may be accurately implemented by establishing a relevance calculation model between image content and the queryquery, inputs of the calculation model being the image content and the queryquery, and an output thereof being a relevance metric value.

That is, the content of the image (preferably comprising a surrounding text of the image and the like) and a query text of the user are deeply converted by using a deep neural network, and a relation between the image (text+content) and the query is established during the conversion. In other words, one end of the input may be the surrounding text of the image, and the image content (or comprising other characteristic or information of the image, such as a click query of the image and various characteristics describing the image quality). The other end of the input is the query text (or comprising other processed characteristics of the query). A final output after the deep neural network is a relevance metric value between the image and the query, which may serve as a one-dimensional characteristic of the relevance of the image and the query.

First Embodiment

FIG. 1 is a flowchart of a method for establishing an image search relevance prediction model according to a first embodiment of the present invention. The method of this embodiment may be executed by an apparatus for establishing an image search relevance prediction model, and the apparatus may be implemented by hardware and/or software and may be generally integrated in a server for establishing an image search relevance prediction model. The method of this embodiment specifically comprises the following steps.

110 training a pre-constructed original deep neural network by using a training sample.

In this embodiment, the training sample comprises: a query and image data.

As described above, to ensure that the deep neural network finally outputs the relevance metric value between the image and the query, the original deep neural network needs to be trained by using the image data and the query as training samples at the same time.

The image data comprises image content data. Typically, the image content data may comprise: pixels of the image or a content characteristic of the image (such as a content characteristic vector) after a certain processing.

Preferably, to further improve the accuracy of the relevance metric value, the image data may further comprise: image associated text data, and/or image associated characteristic data.

The image associated text data specifically refers to: text information that is stored corresponding to the image and used to briefly describe the image content. For example, when an image is stored, a title "birthday card" of the image is stored at the same time.

The image associated characteristic data may comprise: a click query corresponding to the image, and/or a quality characteristic parameter of the image.

In this embodiment, when a search user inputs a target query and clicks to select a target image in an image search result returned by the target query, the target query is a click query of the target image. The quality characteristic parameter may comprise: parameters for describing the image quality, such as an image compression ratio, an image format, and an image resolution, which is not limited in this embodiment.

In this embodiment, the original deep neural network comprises: a representation vector generation network and a relevance calculation network. The representation vector generation network is used to convert different types of data in the training sample into representation vectors and input the representation vectors to the relevance calculation network, and the relevance calculation network is used to convert at least two input representation vectors into a relevance metric value.

In a exemplified implementation of this embodiment, the relevance calculation network may comprise: a hidden layer set and an output layer connected to an output end of the hidden layer set; wherein the hidden layer set comprises one or more hidden layers connected end to end, a representation vector output end of the vector generation network is connected to an input end of the hidden layer set, and the output layer outputs the relevance metric value.

Figure 2:
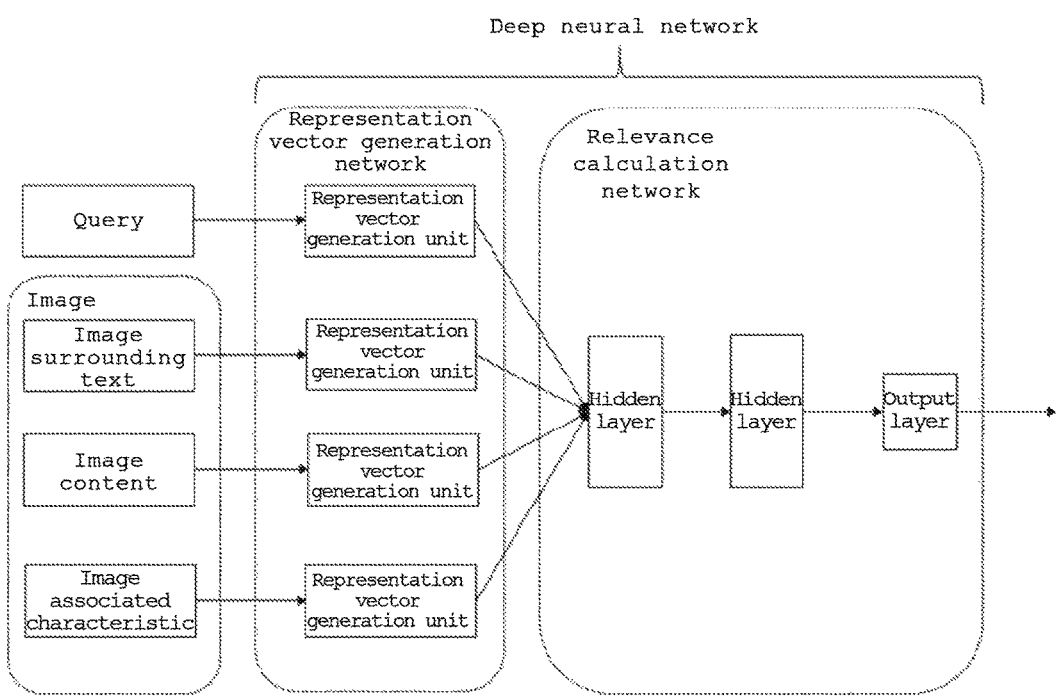
FIG. 2 is a schematic structural diagram for a deep neural network applicable to the first embodiment of the present invention.

FIG. 2 is a schematic structural diagram of a deep neural network applicable to the first embodiment of the present invention. As shown in FIG. 2, the training sample input to the deep neural network may comprise: a query and image data. The image data further comprises: image surrounding text data, image content data, and image associated characteristic data.

The representation vector generation network may comprise four representation vector generation units that are separately configured to convert the input query, the image surrounding text data, the image content data and the image associated characteristic data into corresponding representation vectors, for conducting subsequent model training works.

The representation vector generation unit may have various implementations according to different task targets. A brief description is provided herein:

Generation of a representation vector of the image content data (typically, the image pixel content)

The representation vector generation of the image pixel content is currently widely used in a CNN (Convolutional Neural Network) classification network. The input of the network is a size-normalized image pixel matrix, and the output thereof is a classification representation vector of an image. The classification representation vector is generally a classification probability distribution vector P of the image in a category system (the category system generally has thousands of to tens of thousands of category labels for images). $P=(p_1, p_2, \ldots p_n)$; $p_i(i=1, 2, \ldots, N)$ is a probability, provided by the CNN network, of an image belonging to the $i^{th}$ category, and N is the size (the number of categories) of the category system.

Preferably, after processing such as weight truncation (for example, $p_i$ lower than a threshold is set as 0, or first M $p_i$ are reserved, wherein M is an integer less than or equal to N), normalization, and binarization (conversion into vectors consisting of 0 and 1) is performed on the classification representation vectors, the representation vectors are directly input to the relevance calculation network. Alternatively, the representation vectors may first pass through a full-connection hidden layer (related concepts of the hidden layer will be described later) and then be input to the relevance calculation network. The output of the full-connection hidden layer may be construed as being similar to an Embedding expression (related definitions of the Embedding expression will be described later) of a text.

2. Generation of Representation Vectors of the Image Surrounding Text Data and the Query Because image surrounding text data and the query are both texts, representation vector generation manners thereof are the same, which are both text representation vector generation.

The text is partitioned, and then each partitioned word is mapped into an one-hot representation vector according to a preset dictionary, for example, ( . . . , 0, . . . , 1, . . . , 0, . . . ), wherein the length of the vector is the size of the dictionary, one element is 1, and other elements are all 0. A serial number of the position where the element 1 is located is corresponding to a serial number of the word in the dictionary. There are several options for subsequent processing, such as a BoW-DNN (Bag of Words-Deep Neural Networks) network, a CNN network, or an RNN (Recurrent Neural Network) network, which is not limited in this embodiment.

The BoW-DNN network superimposes one-hot representation vectors of all partitioned words in the text and then inputs them to a full-connection hidden layer. Weights from the position of each partitioned word in the one-hot representation vectors to connection edges of neural units of the hidden layer are jointed to form a vector (the number of dimensions thereof is the same as the number of neural units of the hidden layer), which is also referred to as a word vector of the word. An output vector of the hidden layer is actually a response value of a sum of word vectors of the words in the text passing through the neural units of the hidden layer, and is also referred to as an Embedding representation of the text. Because words in the text are simply superimposed without considering the word order, it is referred to as a Bag of Words.

Considering the word order, the CNN network sequentially joints word vectors of the words in the text, and after an one-dimensional convolution operation and downsampling (also referred to as pooling), a fixed-length vector is obtained. The vector may also be considered as an Embedding representation of the text, but added with the function of partial word order. Such CNN network is also a generalization of applying an image pixel CNN network to one-dimensional texts.

The RNN network also takes the word order into consideration in a manner of inputting word vectors of the words to the full-connection hidden layer, and inputting, as a feedback, an output of a current word after passing through the hidden layer into the hidden layer again together with a next word. The output thereof is also a fixed-length vector, and may also be considered as an Embedding representation of the text.

The word vectors and the three networks may be trained separately, or word vectors or networks that have been trained in other tasks may be used, or the vectors and the three networks may be trained in this task together with the subsequent relevance calculation network. When being trained together with the relevance calculation network, the word vectors and the three networks may be initialized randomly, or may be initialized by using the trained results in other tasks, and continuously updated in the training of this task.

3. Generation of Representation Vectors of Image Associated Characteristic Data

The representation generation network of other characteristic data of the image depends on physical meanings of the characteristics. In case of an ordered format such as an image and a text, the CNN or RNN network may be used. In case of an unordered set characteristic (such as a probability distribution vector and some independent statistical values), the BoW-DNN network may be used.

Similar to the representation vector generation of the text, the representation vector generation of the image pixel content and the representation vector generation of the image associated characteristic data may be trained separately, or trained in this task together with subsequent networks. When being trained together, the parameters may be initialized randomly, or initialization may be conducted by using parameters that have been trained in other tasks.

As shown in FIG. 2, the relevance calculation network further comprises two hidden layers connected end to end, and an output layer.

In this embodiment, the hidden layer refers to a full-connection hidden layer, wherein the full-connection specifically refers to that every output of a previous layer is connected to every input of a next layer. Each hidden layer has several neural units, and the output layer has only one neural unit. All representation vectors of the query and the image data are input to the first full-connection hidden layer. After linear summarization and non-linear responses of the neural units of the hidden layers and the output layer, a numerical value is finally output, which is the relevance metric value between the query and the image.

In another exemplified implementation of this embodiment, the relevance calculation network may further comprise: a first hidden layer set, a first standard vector representation unit connected to an output end of the first hidden layer set, a second hidden layer set, and a second standard vector representation unit connected to an output end of the second hidden layer set. A vector distance calculation unit is connected to output ends of the first standard vector representation unit and the second standard vector representation unit respectively.

The hidden layer set comprises one or more hidden layers connected end to end. A representation vector output end, which corresponds to the query, in the representation generation network is connected to an input end of the first hidden layer set. A representation vector output end, which corresponds to the image data, in the representation generation network is connected to an input end of the second hidden layer set, and the vector distance calculation unit outputs the relevance metric value.

Figure 3:
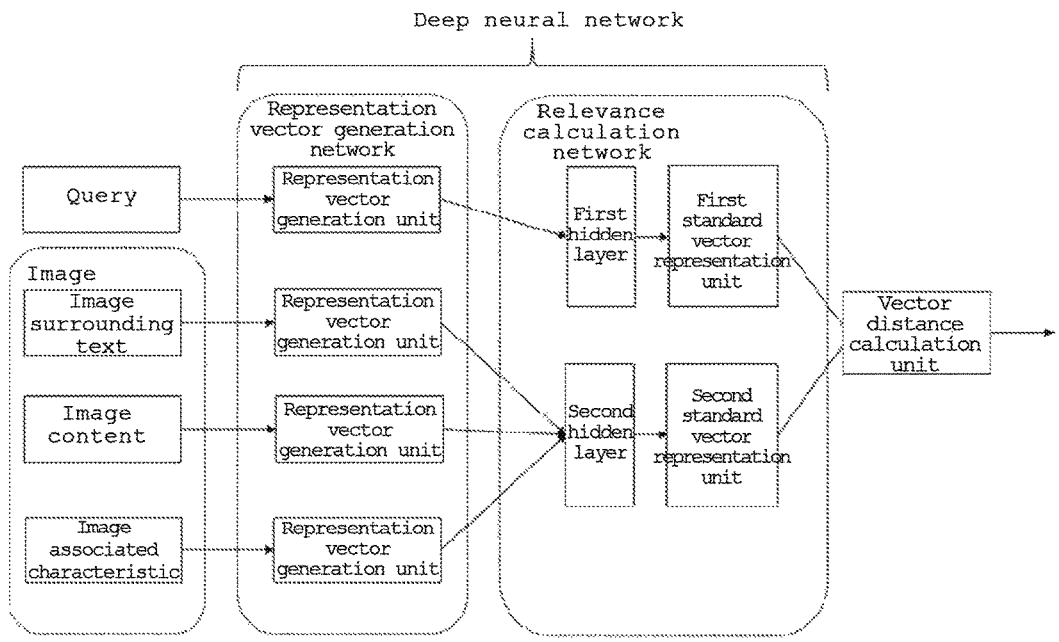
FIG. 3 is a schematic structural diagram of another deep neural network applicable to the first embodiment of the present invention.

FIG. 3 is a schematic structural diagram of another deep neural network applicable to the first embodiment of the present invention. As shown in FIG. 3, a representation vector generation unit corresponding to a query is connected to a first hidden layer. The representation vector generation units corresponding to image surrounding text data, image content data and image associated characteristic data respectively are connected to a second hidden layer. The first hidden layer and the second hidden layer are connected to a first standard vector representation unit and a second standard vector representation unit respectively.

The first standard vector representation unit and the second standard vector representation unit are separately used to convert vectors output by the first hidden layer and the second hidden layer into two new representation vectors. The two new representation vectors not only have a uniform format, but also are in the same representation space, and thereby can be input to a vector distance calculating unit to calculate a relevance metric value.

Typically, the vector distance calculating unit may calculate a cosine distance between the two vectors output by the first standard vector representation unit and the second standard vector representation unit, to determine the relevance metric value between the two vectors, or calculate another vector distance for measuring the similarity between the two vectors, such as an Euclidean distance between the two vectors, which is not limited in this embodiment.

In an exemplified implementation of this embodiment, the hidden layer comprises at least two neural units, and the output layer comprises one neural unit.

The number of vector dimensions generated by the representation vector generation network, the number of hidden layers comprised in the relevance calculation network, the number of neural units comprised in the hidden layer, the type of a response function of the neural unit, and a method of regularizing an output of the neural unit may be predetermined according to a task.

The representation vector generation network and the relevance calculation network constructed in this embodiment mainly have the following variables or parameters:

1) the number of dimensions of an input characteristic (a query and image data). For example, for a text, the number of characteristic dimensions refers to the size of a text dictionary, and is generally hundreds of thousands or millions. A Chinese text may be partitioned first, and a word not existing in the dictionary may be removed, or replaced with a special symbol (which is put in the dictionary). The image pixel content refers to the number of channels and the normalized size of the image;

2) the number of dimensions of a representation vector, and a generation network structure of the representation vector (this part has been described above);

3) the number of hidden layers and the number of neural units of each hidden layer;

4) a response function type of the neural unit;
5) a method of regularizing an output of the neural unit, to avoid overflow and underflow of an output value; and
6) a weight value on an input edge of the neural unit, and an initialization method.

The variables and parameters in 1) and 3) to 5) may be preset according to a task. The weight in 6) is generally initialized in a particular manner (such as random initialization), and is then trained and updated by using a large number of training samples, till it is converged to a certain extent.

120, using the trained original deep neural network as the image search relevance prediction model.

As described above, after the network structure of the original deep neural network is determined, the original deep neural network is trained by using a large number of training samples, to obtain the image search relevance prediction model.

Inputs of the image search relevance prediction model are a query entered by a user and image data of a target image (for example, comprising: image surrounding text data, image content data, and image associated characteristic data), and an output thereof is a relevance metric value between the query and the target image.

In this embodiment of the present invention, an original deep neural network is constructed first, wherein inputs of the original deep neural network are a query and image data, and an output thereof is a relevance metric value between the query and the image data. Appropriate training samples are selected to train the original deep neural network, and finally, the original deep neural network may be trained into an image search relevance prediction model. After an image search engine receives an image query entered by a user, the image query and to-be-sorted images are input to the image search relevance prediction model to obtain relevance metric values between the to-be-sorted images and the image query. Then, the to-be-sorted images are sorted based on the relevance metric values, and the sorting result is returned to the user. The present invention optimizes the existing image search technology, and has stronger capabilities than the prior art as well as various integrations and variations in terms of semantic matching between a query and an image text, semantic matching between a query and image content, click generalization and the like. Moreover, the degree of relevance between an image search result and a query entered by a user can be greatly improved.

Second Embodiment

Figure 4:
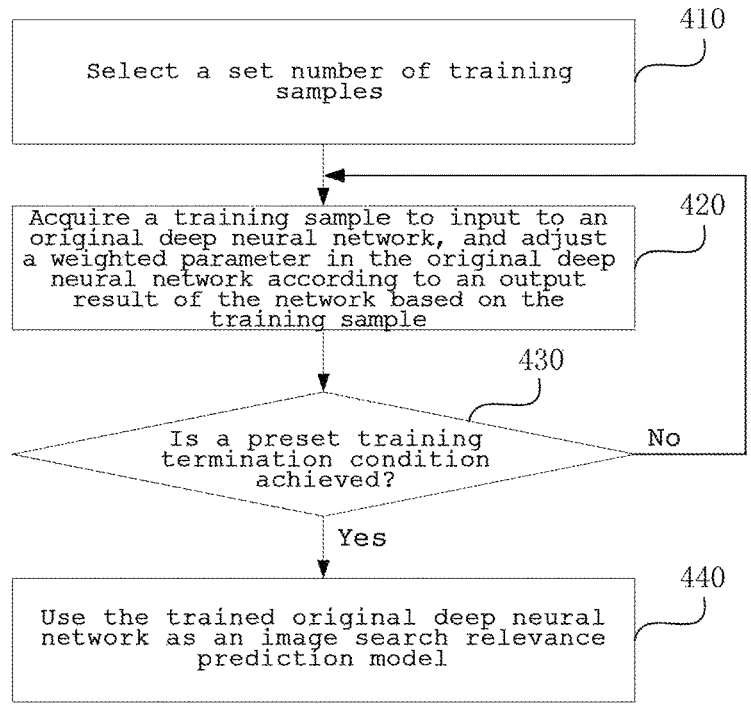
FIG. 4 is a flowchart of a method for establishing an image search relevance prediction model according to a second embodiment of the present invention.

FIG. 4 is a flowchart of a method for establishing an image search relevance prediction model according to a second embodiment of the present invention. This embodiment is optimized on the basis of the above embodiment, and in this embodiment, the step of training a pre-constructed original deep neural network by using a training sample is specifically optimized by: selecting a set number of training samples; sequentially acquiring a training sample to input to the original deep neural network, and adjusting a weighted parameter in the original deep neural network according to an output result, which is obtained in response to inputting the training sample, of the original deep neural network; and returning to execute the operation of acquiring a training sample to input to the original deep neural network, till a preset training termination condition is achieved.

Correspondingly, the method of this embodiment further comprises the following steps:

410 selecting a set number of training samples.

It is tremendously time consuming to directly label a large number of training samples (relevance values between a query and images), and it is hard to find a unified standard. In this embodiment, a query and a positive-negative sample image pair (also briefly referred to as a pair) under the query may be used as a training sample. That is, a training sample consists of a query and a pair formed by two images. In the pair, one image has better relevance with the Query than the other image, and the two images are referred to as a positive sample and a negative sample respectively.

Correspondingly, the training sample may be specifically optimized as: a positive-negative training pair consisting of a training query as well as a positive sample image and a negative sample image that separately correspond to the training query. In a specific example, a training query is "birthday card", a positive sample image corresponding to the training query is an image 1, a negative sample image corresponding to the training query is an image 2, and therefore, a training sample in the form of <(birthday card, image 1), (birthday card, image 2)> may be constructed accordingly.

The positive sample image and the negative sample image corresponding to the training query may be manually determined according to the degree of relevance between different images and the query. However, high labour costs are required because a large number of training samples are involved during training of the original deep neural network. In addition, different persons have different evaluation standards on the degree of relevance. Therefore, in a exemplified implementation of this embodiment, a positive sample image and a negative sample image corresponding to a query may be automatically determined according to image click logs of users. For example, after a user enters a query to search for an image, an image clicked by the user based on a searching result is used as a positive sample image corresponding to the query, and an image not clicked by the user is used as a negative sample image corresponding to the query.

420, sequentially acquiring a training sample to input to the original deep neural network, and adjusting a weighted parameter of the original deep neural network according to an output result, which is obtained in response to inputting the training sample, of the original deep neural network.

Figure 5:
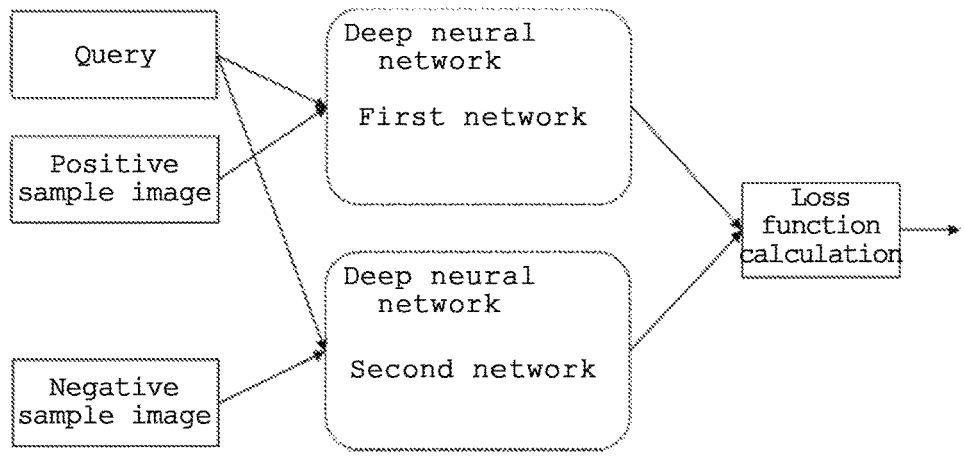
FIG. 5 is a schematic structural diagram for a training network model applicable to the second embodiment of the present invention.

In this embodiment, the training of the original deep neural network is accomplished by using the positive-negative training pair, and therefore, to improve the training efficiency, preferably, two completely identical original deep neural networks may be constructed for receiving a positive training pair consisting of the training query and the positive sample image and a negative training pair consisting of the training query and the negative sample image, respectively, thereby implementing quick and real-time model training. FIG. 5 shows a schematic structural diagram of a training network model.

As shown in FIG. 5, 420 may preferably comprise the following operations:

inputting the training query and image data corresponding to the positive sample image to a first network with a structure identical to that of the original deep neural network, and acquiring a first predicted value output by the first network; inputting the training query and image data corresponding to the negative sample image to a second network with a structure identical to that of the first network, and acquiring a second predicted value output by the second network;

calculating a loss function according to the first predicted value, the second predicted value, and a relevance partial order between the positive sample image and the negative sample image; and updating, along a direction reverse to a direction of minimizing the loss function, weighted parameters of layers in the first network and the second network layer-by-layer by using a set weight updating algorithm.

In a specific example, a query and a positive sample image are input to a first network with a structure identical to that of the original deep neural network, to obtain a relevance predicted value 1. The query and a negative sample image are input to a second network (comprising a weight) identical to the first network, to obtain a relevance predicted value 2. Depending on whether a sign of a difference between the predicted value 1 and the predicted value 2 is consistent with a relevance partial order between the positive sample image and the negative sample image, the difference is included in a loss function (also referred to as a rank cost).

Next, like the method for training a general deep neural network, weights of layers are updated layer-by-layer along a direction reverse to the direction of minimizing the loss function, and this type of method is generally referred to as a Back Propagation (BP) algorithm. Specific weight updating algorithms comprise various gradient descent methods, such as LBFGS (quasi-newton algorithm) or SGD (stochastic gradient descent), wherein the SGD has a faster convergence speed and is used more commonly.

Different from the general deep neural network training, the technical solution of this embodiment involves two identical networks, the parameters are shared, and weights are always updated synchronously.

430 determining whether a preset training termination condition is achieved: if yes, executing 440; otherwise, returning to execute 420.

In this embodiment, a training termination condition may be set according to actual requirements, for example, the number of training rounds (such as 1000 or 2000), a total error value of the neural network with respect to the training samples, or the like, which is not limited in this embodiment.

440 using the trained original deep neural network as the image search relevance prediction model.

The technical solution of the present invention constructs a positive-negative training pair according to positive and negative sample images corresponding to a same training query to serve as a training sample, and constructs, based on the positive-negative training pair, two networks identical to a preset original neural network model, so as to train weights of the model synchronously based on the positive-negative training pair. Accordingly, it avoids the problems that it is tremendously time consuming to manually label a large number of training samples, and it is hard to find a unified standard. Moreover, training of the original neural network model can be accomplished quickly and efficiently.

Third Embodiment

Figure 6:
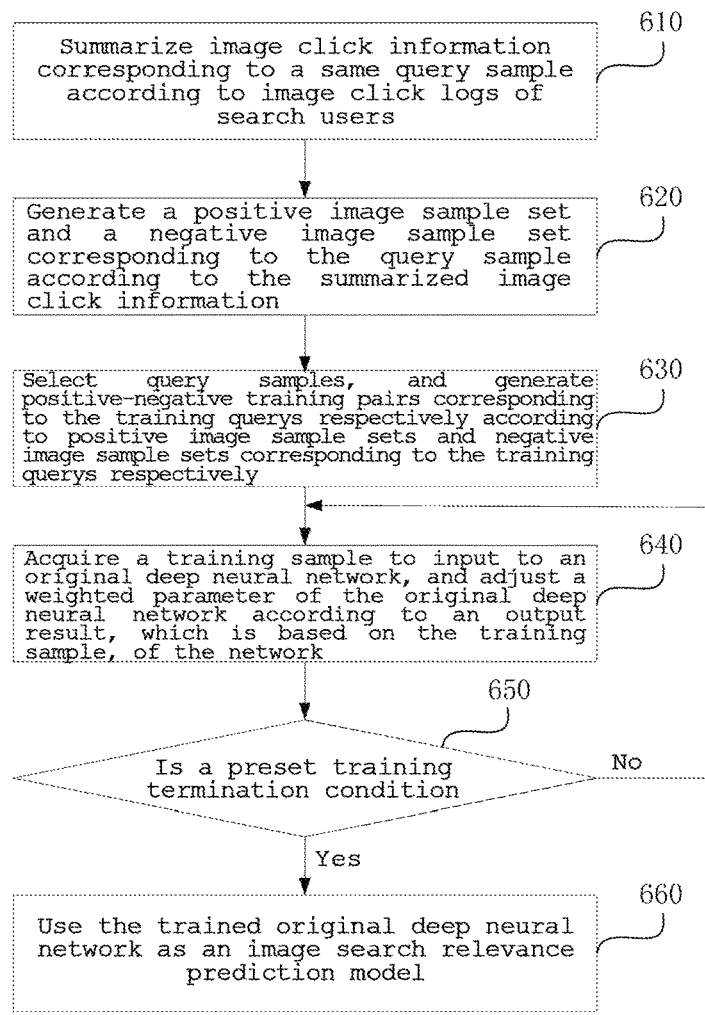
FIG. 6 is a flowchart of a method for establishing an image search relevance prediction model according to a third embodiment of the present invention.

FIG. 6 is a flowchart for a method of establishing an image search relevance prediction model according to a third embodiment of the present invention. This embodiment is optimized on the basis of the foregoing embodiment. In this embodiment, the step of selecting a set number of training samples is specifically optimized by: summarizing image click information corresponding to a same query sample according to image click logs of search users, wherein the query sample comprises: a single query or at least two queries meeting a set similarity threshold condition; generating a positive image sample set and a negative image sample set corresponding to the query sample according to the summarized image click information; and selecting a set number of query samples as the training queries, and generating positive-negative training pairs corresponding to the training queries respectively according to positive image sample sets and negative image sample sets corresponding to the training queries respectively, to serve as the training samples.

Correspondingly, the method of this embodiment further comprises the following steps:

610 summarizing image click information corresponding to the same query sample according to image click logs of search users.

Generally speaking, the preset original neural network has a great number of weight parameters, and if text-related parameters (for example, Embedding parameters of a text dictionary) in a representation vector generation network are all put in training update, there will be millions of parameters. For parameters of such a scale, training data required is mainly generated from image click logs of users.

A user may click multiple images in a query process. The clicked images may have better relevance with a query entered by the user than images viewed but not clicked by the user.

Repeated queries of a large number of users are summarized to obtain more credible positive and negative sample images statistically: images having high click-through rates (positive sample images) versus images having low click-through rates (negative sample images), and images having a lot of clicks (positive sample images) versus images having no clicks (negative sample images).

The query sample may merely comprise a single query. Further, less popular queries having less clicks or no clicks may share clicked images with other queries according to semantic similarities. Correspondingly, the query sample may further comprise at least two queries meeting a set similarity threshold condition.

In a specific example, "birthday card" may be directly selected as a query sample, or "birthday card", "birthdate card" and "date-of-birth card" may be used as query samples in a manner of semantic similarity clustering.

620, generating a positive image sample set and a negative image sample set corresponding to the query sample according to the summarized image click information.

In an exemplified implementation of this embodiment, the image click information may merely comprise: clicked images corresponding to the query sample.

Correspondingly, the step of generating a positive image sample set and a negative image sample set corresponding to the query sample according to the summarized image click information may further comprise: grouping, among the clicked images, images with the number of clicks exceeding a first threshold into the positive image sample set, and images with the number of clicks less than a second threshold into the negative image sample set.

The first threshold and the second threshold may be preset according to actual conditions, and they may be identical or different, which is not limited in this embodiment.

In another exemplified implementation of this embodiment, the image click information may comprise both clicked images corresponding to the query sample and an image search result corresponding to the query sample.

Correspondingly, the step of generating a positive image sample set and a negative image sample set corresponding to the query sample according to the summarized image click information may further comprise: among images corresponding to the image search result, grouping clicked images into the positive image sample set, and grouping unclicked images into the negative image sample set.

630, selecting a set number of query samples as the training queries, and generating positive-negative training pairs corresponding to the training queries respectively according to positive image sample sets and negative image sample sets corresponding to the training queries respectively, to serve as the training samples.

Figure 7:
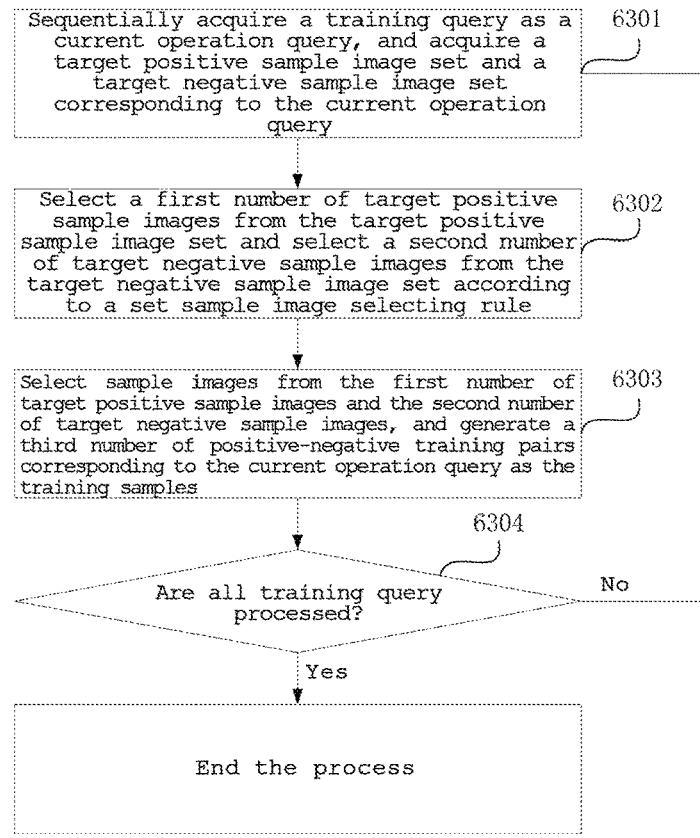
FIG. 7 is a flowchart of a method for generating a positive-negative sample pair according to the third embodiment of the present invention.

As shown in FIG. 7, in a exemplified implementation of this embodiment, the step 630 may further comprise the following operations:

6301, sequentially acquiring a training query as a current operation query, and acquiring a target positive sample image set and a target negative sample image set corresponding to the current operation query.

In a specific example, the acquired training query is "birthday card", a target positive sample image set corresponding to the "birthday card" comprises: "image 1~image 20", and a target negative sample image set corresponding to the "birthday card" comprises: "image 21~image 80".

6302, selecting a first number of target positive sample images from the target positive sample image set and selecting a second number of target negative sample images from the target negative sample image set according to a set sample image selecting rule.

The set sample image selecting rule may comprise: the selecting according to the number of clicks, the selecting according to the heat of images, the selecting randomly or the like, which is not limited in this embodiment. Meanwhile, the first number may be identical to or different from the second number, and the two may be selected in a customized manner according to actual requirements.

Further, to enhance the diversity of the training samples, some images may be selected randomly from presented images of other queries to serve as negative samples, referred to as random negative samples. It should be understood that because the random negative sample is significantly different from the current operation query, it may be considered as highly credible.

That is, at least one image is acquired from a positive image sample set corresponding to a non-associated query other than the current operation query, to serve as a target negative sample image corresponding to the current operation query.

For example, a positive sample image set corresponding to a query "tiger" comprises "image 81~image 100", and "image 81~image 100" may all be used as target negative sample images of "birthday card".

Still referring to the foregoing example, target positive sample images: "image 1~image 3" corresponding to the training query "birthday card" and target negative sample images: "image 21~image 22, image 81" corresponding to the training query "birthday card" may be selected.

6303, separately selecting sample images from the first number of target positive sample images and the second number of target negative sample images according to a set positive-negative image combination rule, and generating a third number of positive-negative training pairs corresponding to the current operation query as the training samples.

In an exemplified implementation of this embodiment, the set positive-negative image combination rule may comprise: combining any of the target positive sample images and any of the target negative sample images into a positive-negative training pair, to finally determine the training samples.

For example: <(birthday card, image 1), (birthday card, image 21)>, <(birthday card, image 2), (birthday card, image 22)>, <(birthday card, image 3), (birthday card, image 81)>.

In another exemplified implementation of this embodiment, the set positive-negative image combination rule of may further comprise: separately combining each of the target positive sample images and each of the target negative sample images into a positive-negative training pair, to finally determine the training samples.

For example: <(birthday card, image 1), (birthday card, image 21)>, <(birthday card, image 1), (birthday card, image 22)>, <(birthday card, image 1), (birthday card, image 81)>, <(birthday card, image 2), (birthday card, image 21)>, <(birthday card, image 2), (birthday card, image 22)>, <(birthday card, image 2), (birthday card, image 81)>, <(birthday card, image 3), (birthday card, image 21)>, <(birthday card, image 3), (birthday card, image 22)>, <(birthday card, image 3), (birthday card, image 81)>.

Definitely, persons skilled in the art may understand that the training samples may be finally generated by using other positive-negative image combination rules, which is not limited in this embodiment.

6304, determining whether all training queries are processed: if yes, ending the process; otherwise, returning to execute 6301.

640, sequentially acquiring a training sample to input to the original deep neural network, and adjusting a weighted parameter in the original deep neural network according to an output result, which is obtained in response to inputting the training sample, of the original deep neural network.

650, determining whether a preset training termination condition is achieved: if yes, executing 660; otherwise, returning to execute 640.

660, using the trained original deep neural network as the image search relevance prediction model.

According to the technical solution of this embodiment, by finally acquiring training samples from image click logs of users, positive and negative sample images that are more statistically credible can be obtained. A finally trained image search relevance prediction model based on the positive and negative sample images can be closer to an ideal or a required relevance prediction model. Therefore, an image search result based on the image search relevance prediction model is closer to actual requirements of users, thereby improving search experience of the users.

On the basis of the above embodiments, before summarizing image click information corresponding to a same query sample according to image click logs of search users, the method may further comprise: filtering out noise logs comprised in the image click logs.

Such setting is carried out because there may be much noise in image click logs of users. For example, a user is instead attracted to click some inappropriate images or malicious images that significantly contrast with related images, or such images are clicked in whatever queries. In some queries involving a lot of related results, the requirement of a user is already met after the user browses related images at the front, and probabilities of subsequent related images being clicked will significantly decrease. Such two behaviors will result in distortion of click/non-click, the number of clicks, and the relevance. Therefore, to further improve the accuracy of selected positive and negative sample images, it is necessary to filter out noise logs comprised in the image click logs.

Noise log recognition and removal are necessary operations for ensuring the accuracy of a trained model. Two methods are briefly introduced herein:

Click query clustering method: All queries (referred to as click queries below) in which an image (comprising repeated images and similar images) is clicked are gathered and clustered, and thus major requirement categories that the image meets can be obtained while minor categories can be regarded as noise and hence removed. All click queries far away from the major requirement queries can be considered as noise clicks.

Image clustering method: All clicked images corresponding to a query (comprising semantically identical and similar queries) are gathered, and classification results or class representations of these images are clustered; thus major image categories meeting the requirement of the query can be obtained while minor categories can be regarded as noise and hence removed.

On the basis of the embodiments above, when positive and negative sample images are selected, positive (negative) samples under a query may be sorted according to credibility thereof. The credibility of a positive sample may be deduced according to user behavior evidence. For example, generally speaking, a positive sample having a higher click-through rate, having more clicks, and presented farther away from the top when being clicked has higher credibility. The negative samples also have a similar sorting method. For negative samples presented but having no clicks, if there is no user behaviour evidence, the credibility thereof may also be deduced according to relevance. For example, a negative sample having less presentations (in the same time window) and presented farther away from the top has poorer relevance, and has higher credibility. The credibility of a random negative sample may be considered as the highest.

Meanwhile, when the positive and negative sample images are selected, positive (negative) samples after being sorted may be selected sequentially or randomly, to balance noise and model distinctions. Moreover, queries may be selected according to a task target, and proportions of different types of queries are adjusted, for example: the proportion of high-frequency (low-frequency) queries, the proportion of queries having a large (small) number of resources, or the like.

In addition, it should be emphasized again that main differences between the embodiments of the present invention and the prior art lie in that:

Almost all existing text matching characteristics are literal matching of texts (comprising synonym expansion matching); however, the query text and image text in the present invention are matched in a representation space after deep conversion, which have a more generalized meaning, and can implement literally different but semantically correlated matching to some extent.

For the existing classification matching characteristics, a classification result thereof is not semantically refined when a category system for image classification is excessively small, while the classification accuracy is low and the difficulty of matching with a text (or a category label) of the query increases dramatically (which is the so-called semantic gap between an image and a text) when the category system is excessively large. In the embodiments of the present invention, the query text and the image pixel content are matched in the representation space after deep conversion, and are not limited by the query or the image category system.

The existing click-through rate characteristic only applies to images with valid clicks in the query. The network parameters in the embodiments of the present invention are obtained through training based on image click behaviors under all queries, and it generalizes the measure of relevance between images comprised in the user click behaviors and the query to any image not clicked or sparsely clicked image, and also to any query related to the current query, thereby implementing relevance calculation between any query and image.

In view of the above, the present invention has stronger capabilities than the prior art as well as various integrations and variations in terms of semantic matching between a query and an image text, semantic matching between a query and image content, click generalization and the like, and more thoroughly solves the problems expected to be solved.

Fourth Embodiment

Figure 8:
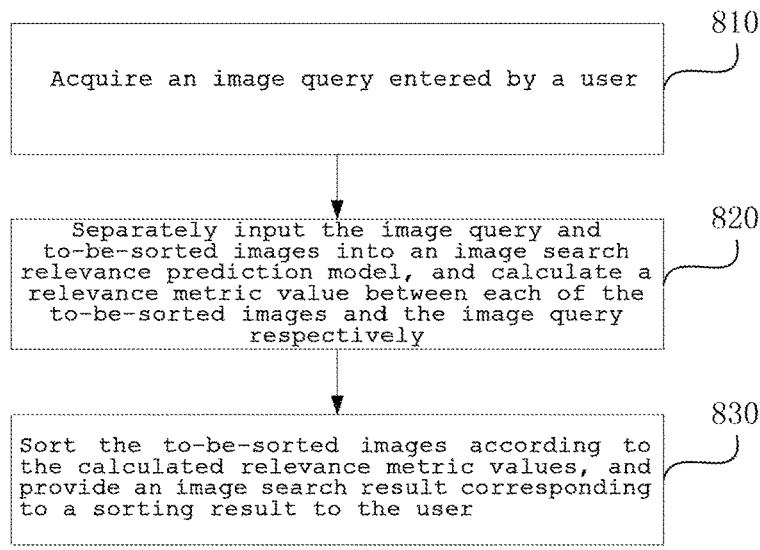
FIG. 8 is a flowchart of an image search method according to a fourth embodiment of the present invention.

FIG. 8 is a flow chart of an image search method according to a fourth embodiment of the present invention. The method of this embodiment may be executed by an image search apparatus, and the apparatus may be implemented by hardware and/or software and may be generally integrated in a server where an image search engine is located. The method of this embodiment further comprises the following steps:

810, acquiring an image query entered by a user.

In this embodiment, the image query further refers to a text-form query entered by the user through an image search engine, for example: "birthday card".

820, separately inputting the image query and to-be-sorted images into the image search relevance prediction model established by using the method in the first embodiment to the third embodiment of the present invention, and separately calculating a relevance metric value between each of the to-be-sorted images and the image query.

In this embodiment, the to-be-sorted images specifically refer to image search results recalled by the image search engine and corresponding to the image query.

830, sorting the to-be-sorted images according to the calculated relevance metric values, and providing an image search result corresponding to the sorting result to the user.

The technical solution of this embodiment inputs an image query and to-be-sorted images to an image search relevance prediction model trained in advance, to obtain relevance metric values between the to-be-sorted images and the image query. Then, the to-be-sorted images are sorted based on the relevance metric values, and the sorting result is returned to the user. The technical solution optimizes the existing image search technology, and has stronger capabilities than the prior art as well as various integrations and variations in terms of semantic matching between a query and an image text, semantic matching between a query and image content, click generalization and the like. Moreover, the degree of relevance between an image search result and a query entered by a user can be greatly improved.

In addition, it should be noted that, the inventor finds through experiments that: the technical solution of this embodiment of the present invention significantly improves relevance of image search. Evaluations show that, after the relevance characteristic is added, retrieval result satisfaction of the image search with a random query is improved by more than 10%. That is, a difference between the number of queries whose retrieval results perceivably improve and the number of queries whose retrieval results perceivably deteriorate accounts for more than 10% of randomly sampled queries, and the effect is very remarkable.

Fifth Embodiment

Figure 9:
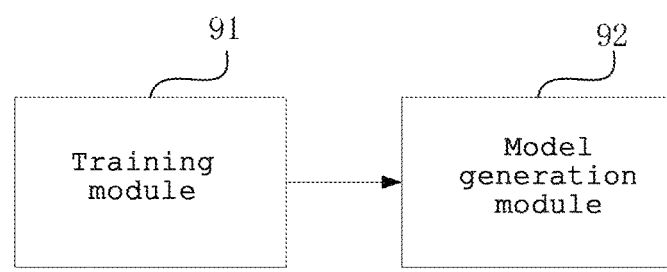
FIG. 9 is a structural diagram of an apparatus for establishing an image search relevance prediction model according to a fifth embodiment of the present invention.

FIG. 9 is a structural diagram of an apparatus of establishing an image search relevance prediction model according to a fifth embodiment of the present invention. As shown in FIG. 9, the apparatus comprises:

- a training module 91, configured to train a pre-constructed original deep neural network by using a training sample, wherein the training sample comprises: a query and image data, and the original deep neural network comprises: a representation vector generation network and a relevance calculation network, the representation vector generation network is used to convert different types of data in the training sample into representation vectors and input the representation vectors to the relevance calculation network, and the relevance calculation network is used to convert at least two input representation vectors into a relevance metric value; and
- a model generation module 92, configured to use the trained original deep neural network as the image search relevance prediction model.

In the embodiment of the present invention, an original deep neural network is constructed, inputs of the original deep neural network are a query and image data, and an output thereof is a relevance metric value between the query and the image data. Appropriate training samples are selected to train the original deep neural network, and finally, the original deep neural network may be trained into an image search relevance prediction model. After an image search engine receives an image query entered by a user, the image query and to-be-sorted images are input to the image search relevance prediction model to obtain relevance metric values between the to-be-sorted images and the image query. Then, the to-be-sorted images are sorted based on the relevance metric values, and the sorting result is returned to the user. The present invention optimizes the existing image search technology, and has stronger capabilities than the prior art as well as various integrations and variations in terms of semantic matching between a query and an image text, semantic matching between a query and image content, click generalization and the like. Moreover, the degree of relevance between an image search result and a query entered by a user can be greatly improved.

On the basis of the foregoing embodiments, the image data may comprise: image associated text data, image content data and image associated characteristic data; wherein the image associated characteristic data comprises: a click query corresponding to the image, and/or a quality characteristic parameter of the image.

On the basis of the above embodiments, the relevance calculation network may comprise: a hidden layer set and an output layer connected to an output end of the hidden layer set; wherein the hidden layer set comprises one or more hidden layers connected end to end, a representation vector output end of the vector generation network is connected to an input end of the hidden layer set, and the output layer outputs the relevance metric value.

On the basis of the above embodiments, the relevance calculation network may further comprise: a first hidden layer set, a first standard vector representation unit connected to an output end of the first hidden layer set, a second hidden layer set, and a second standard vector representation unit connected to an output end of the second hidden layer set. A vector distance calculation unit is connected to output ends of the first standard vector representation unit and the second standard vector representation unit, respectively. The hidden layer set comprises one or more hidden layers connected end to end, a representation vector output end, which corresponds to the query, in the representation generation network is connected to an input end of the first hidden layer set, a representation vector output end, which corresponds to the image data, in the representation generation network is connected to an input end of the second hidden layer set, and the vector distance calculation unit outputs the relevance metric value.

On the basis of the above embodiments, the hidden layer comprises at least two neural units, and the output layer comprises one neural unit; wherein the number of vector dimensions generated by the representation vector generation network, the number of hidden layers comprised in the relevance calculation network, the number of neural units comprised in the hidden layer, the type of a response function of the neural unit, and a method of regularizing an output of the neural unit are preset according to a task.

On the basis of the above embodiments, the training module may comprise:

- a training sample selection unit, configured to select a set number of training samples;
- a weighted parameter adjustment unit, configured to sequentially acquire a training sample to input to the original deep neural network, and adjust a weighted parameter in the original deep neural network according to an output result, which is based on the training sample, of the original deep neural network; and
- a looping execution unit, configured to return to execute the operation of acquiring a training sample to input to the original deep neural network, till a preset training termination condition is achieved.

On the basis of the above embodiments, the training sample may further comprise: a positive-negative training pair consisting of a training query as well as a positive sample image and a negative sample image that separately correspond to the training query.

The weighted parameter adjustment unit may be further configured to:

input the training query and image data corresponding to the positive sample image to a first network with a structure identical to that of the original deep neural network, and acquire a first predicted value output by the first network;

input the training query and image data corresponding to the negative sample image to a second network in a structure identical to that of the first network, and acquire a second predicted value output by the second network;

calculate a loss function according to the first predicted value, the second predicted value, and a relevance partial order between the positive sample image and the negative sample image; and update, along a direction reverse to a direction of minimizing the loss function, weighted parameters of layers in the first network and the second network layer by layer by using a set weight updating algorithm.

On the basis of the above embodiments, the training sample selecting module may further comprise:

an image click information summarization subunit, configured to summarize image click information corresponding to a same query sample according to image click logs of search users, wherein the query sample comprises: a single query or at least two queries meeting a set similarity threshold condition;

a positive-negative image sample set generation subunit, configured to generate a positive image sample set and a negative image sample set corresponding to the query sample according to the summarized image click information; and a training sample generation subunit, configured to select a set number of query samples as the training queries, and generate positive-negative training pairs corresponding to the training queries respectively according to positive image sample sets and negative image sample sets corresponding to the training queries respectively, to serve as the training samples.

On the basis of the above embodiments, the image click information may comprise: clicked images corresponding to the query samples.

The positive-negative image sample set generation subunit may be further configured to: among the clicked images, group images with the number of clicks exceeding a first threshold into the positive image sample set, and group images with the number of clicks less than a second threshold into the negative image sample set.

On the basis of the above embodiments, the image click information may comprise: clicked images corresponding to the query sample, and an image search result corresponding to the query sample.

The positive-negative image sample set generation subunit may be further configured to: among images corresponding to the image search results, group clicked images into the positive image sample set, and group unclicked images into the negative image sample set.

On the basis of the above embodiments, the training sample generation subunit may be further configured to:

sequentially acquire a training query as a current operation query, and acquire a target positive sample image set and a target negative sample image set corresponding to the current operation query;

select a first number of target positive sample images from the target positive sample image set and select a second number of target negative sample images from the target negative sample image set according to a set sample image selecting rule;

separately select sample images from the first number of target positive sample images and the second number of target negative sample images according to a set positive-negative image combination rule, and generate a third number of positive-negative training pairs corresponding to the current operation query as the training samples; and return to execute the operation of acquiring a training query as a current operation query, till completing processing of all training queries.

On the basis of the above embodiments, the training sample generation subunit may further be further configured to: acquire at least one image from a positive image sample set corresponding to a non-associated query other than the current operation query, to serve as a target negative sample image corresponding to the current operation query.

On the basis of the above embodiments, the training sample selecting module may further comprise: a noise log filtering sub-unit, configured to: before the image click information corresponding to the same query sample are summarized according to the image click logs of the search users, filter out noise logs comprised in the image click logs.

The apparatus of establishing an image search relevance prediction model provided in this embodiment of the present invention may be used to execute the method of establishing an image search relevance prediction model provided in the first embodiment to the third embodiment of the present invention, has corresponding function modules, and can implement the same beneficial effects.

Sixth Embodiment

Figure 10:
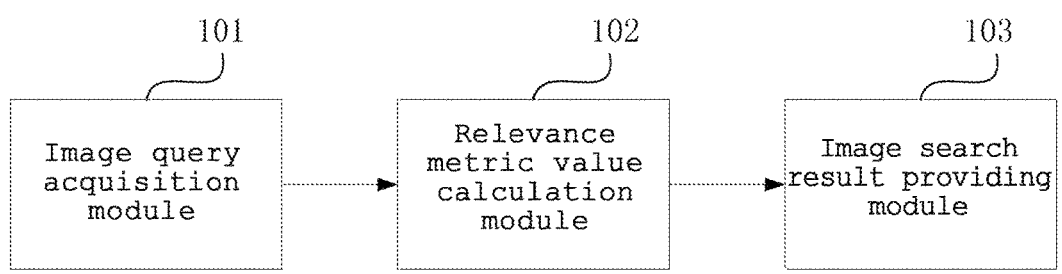
FIG. 10 is a structural diagram of an image search apparatus according to a sixth embodiment of the present invention.

FIG. 10 is a structural diagram of an image search apparatus according to a sixth embodiment of the present invention. As shown in FIG. 10, the apparatus comprises:

an image query acquisition module 101, configured to acquire an image query entered by a user;

a relevance metric value calculation module 102, configured to separately input the image query and to-be-sorted images into the image search relevance prediction model established by using the apparatus described in the fifth embodiment, and separately calculate a relevance metric value between each of the to-be-sorted images and the image query; and an image search result providing module 103, configured to sort the to-be-sorted images according to the calculated relevance metric values, and provide an image search result corresponding to the sorting result to the user.

The technical solution of this embodiment inputs an image query and to-be-sorted images to an image search relevance prediction model trained in advance to obtain relevance metric values between the to-be-sorted images and the image query. Then, the to-be-sorted images are sorted based on the relevance metric values, and the sorting result is returned to the user. The technical solution optimizes the existing image search technology, and has stronger capabilities than the prior art as well as various integrations and variations in terms of semantic matching between a query and an image text, semantic matching between a query and image content, click generalization and the like. Moreover, the degree of relevance between an image search result and a query entered by a user can be greatly improved.

The image search apparatus provided in the embodiment of the present invention may be used to execute the image search method provided in any embodiment of the present invention, has corresponding function modules, and can implement the same beneficial effects.

Apparently, those skilled in the art should understand that the foregoing modules or steps of the present invention may be implemented by a server as described above. Optionally, the embodiments of the present invention may be implemented by using a program executable by a computer device, and thus they can be stored in a storage device and executed by a processor. The program may be stored in a computer readable storage medium, and the storage medium may be a read-only memory, a magnetic disk, an optical disc, or the like. Alternatively, they are made into integrated circuit modules respectively, or multiple modules or steps among them are made into a single integrated circuit module for implementation. In this way, the present invention is not limited to any specific hardware-software combination.

The above description describes merely exemplified embodiments of the present invention, but is not intended to limit the present invention. Those skilled in the art may make various changes and modifications to the present invention. All modifications, equivalent replacements and improvements made within the spirit and principle of the present invention should be covered in the protection scope of the present invention.

What is claimed is:

1. A method for establishing an image search relevance prediction model, comprising:

training a pre-constructed original deep neural network by using a training sample; the training sample comprising image data and a training query, the original deep neural network comprising: a representation vector generation network and a relevance calculation network, the representation vector generation network used to convert different types of data in the training sample into representation vectors and input the representation vectors to the relevance calculation network, and the relevance calculation network used to convert at least two input representation vectors into a relevance metric value; and using the trained original deep neural network as the image search relevance prediction model, wherein the training sample further comprises a positive-negative training pair consisting of a positive sample image and a negative sample image respectively corresponding to the training query, and the training a pre-constructed original deep neural network by using a training sample comprises:

inputting the training query, image data corresponding to the positive sample and image data corresponding to the negative sample image to the original deep neural network, and acquiring, from the original deep neural network, a first predicted value corresponding to the positive sample and a second predicted value corresponding to the negative sample;

calculating a loss function based on the first predicted value corresponding to the positive sample, the second predicted value corresponding to the negative sample, and a relevance partial order between the positive sample image and the negative sample image; and updating, along a direction reverse to a direction of minimizing the loss function, weighted parameters of layers in the original deep neural network.

2. The method according to claim 1, wherein the image data comprises: image associated text data, image content data and image associated characteristic data;

wherein the image associated characteristic data comprises: a click query corresponding to the image, and/or a quality characteristic parameter of the image.

3. The method according to claim 1, wherein the relevance calculation network comprises: a hidden layer set and an output layer connected to an output end of the hidden layer set;

wherein, the hidden layer set comprises one or more hidden layers connected end to end, a representation vector output end of the vector generation network is connected to an input end of the hidden layer set, and the output layer outputs the relevance metric value.

4. The method according to claim 3, wherein the hidden layer comprises at least two neural units, and the output layer comprises one neural unit;

wherein the number of vector dimensions generated by the representation vector generation network, the number of hidden layers included in the relevance calculation network, the number of neural units included in the hidden layer, the type of a response function of the neural unit, and a method of regularizing an output of the neural unit are preset based on a task.

5. The method according to claim 1, wherein the relevance calculation network comprises:

a first hidden layer set, a first standard vector representation unit connected to an output end of the first hidden layer set, a second hidden layer set, a second standard vector representation unit connected to an output end of the second hidden layer set, and a vector distance calculation unit connected to an output end of the first standard vector representation unit and an output end of the second standard vector representation unit respectively;

wherein the hidden layer set comprises one or more hidden layers connected end to end, a representation vector output end corresponding to the query, in the representation generation network is connected to an input end of the first hidden layer set, a representation vector output end corresponding to the image data, in the representation generation network is connected to an input end of the second hidden layer set, and the vector distance calculation unit outputs the relevance metric value.

6. The method according to claim 1, wherein the training a pre-constructed original deep neural network by using a training sample comprises:

returning to execute the operation of inputting the training sample to the original deep neural network, till reaching a preset training termination condition.

7. The method according to claim 6, wherein the inputting the training query, image data corresponding to the positive sample and image data corresponding to the negative sample image to the original deep neural network, and acquiring, from the original deep neural network, a first predicted value corresponding to the positive sample and a second predicted value corresponding to the negative sample comprises:

inputting the training query and image data corresponding to the positive sample image to a first network with a structure identical to that of the original deep neural network, and acquiring a first predicted value output by the first network, and inputting the training query and image data corresponding to the negative sample image to a second network with a structure identical to that of the first network, and acquiring a second predicted value output by the second network.

8. The method according to claim 7, wherein the selecting a set number of training samples comprises:

summarizing image click information corresponding to a same query sample according to image click logs of search users, wherein the query sample comprises: a single query; or at least two query expressions meeting a set similarity threshold condition;

generating a positive image sample set and a negative image sample set corresponding to the query sample expression according to the summarized image click information; and selecting a set number of query samples as the training query, and generating positive-negative training pairs corresponding to the training expressions respectively according to positive image sample sets and negative image sample sets corresponding to the training queries respectively, to serve as the training samples.

9. The method according to claim 8, wherein the image click information comprises: clicked images corresponding to the query sample; and the generating a positive image sample set and a negative image sample set corresponding to the query sample according to the summarized image click information further comprises:
grouping, among the clicked images, images with the number of clicks exceeding a first threshold into the positive image sample set, and
grouping, among the clicked images, images with the number of clicks less than a second threshold into the negative image sample set.

10. The method according to claim 8, wherein the image click information comprises: clicked images corresponding to the query sample and an image search result corresponding to the query sample; and
the generating a positive image sample set and a negative image sample set corresponding to the query sample according to the summarized image click information further comprises:
grouping, among images corresponding to the image search result, clicked images into the positive image sample set, and unclicked images into the negative image sample set, respectively.

11. The method according to claim 8, wherein the generating positive-negative training pairs corresponding to the training queries respectively according to positive image sample sets and negative image sample sets corresponding to the training queries respectively, to serve as the training samples further comprises:
sequentially acquiring a training query as a current operation query, and acquiring a target positive sample image set and a target negative sample image set corresponding to the current operation query;
selecting a first number of target positive sample images from the target positive sample image set and selecting a second number of target negative sample images from the target negative sample image set according to a set sample image selecting rule;
separately selecting sample images from the first number of target positive sample images and the second number of target negative sample images according to a set positive-negative image combination rule, and generating a third number of positive-negative training pairs corresponding to the current operation query as the training samples; and
returning to execute the operation of acquiring the training query as the current operation query, till completing processing all training queries.

12. The method according to claim 11, wherein the selecting a first number of target positive sample images from the target positive sample image set and selecting a second number of target negative sample images from the target negative sample image set according to a set sample image selecting rule further comprises:
acquiring at least one image from a positive image sample set corresponding to a non-associated query other than the current operation query, to serve as a target negative sample image corresponding to the current operation query.

13. The method according to claim 8, wherein before summarizing image click information corresponding to a same query sample according to image click logs of search users, the method further comprises:
filtering out noise logs included in the image click logs.

14. An apparatus of establishing an image search relevance prediction model, comprising:
at least one processor; and
a memory storing instructions, which when executed by the at least one processor, cause the at least one processor to perform operations, the operations comprising:
training a pre-constructed original deep neural network by using a training sample;
wherein the training sample comprises: a training query and image data, and the original deep neural network comprises: a representation vector generation network and a relevance calculation network, the representation vector generation network is used to convert different types of data in the training sample into representation vectors and input the representation vectors to the relevance calculation network, and the relevance calculation network is used to convert at least two input representation vectors into a relevance metric value; and
using the trained original deep neural network as the image search relevance prediction model,
wherein the training sample further comprises a positive-negative training pair consisting of a positive sample image and a negative sample image respectively corresponding to the training query, and the training a pre-constructed original deep neural network by using a training sample comprises:
inputting the training query, image data corresponding to the positive sample and image data corresponding to the negative sample image to the original deep neural network, and acquiring, from the original deep neural network, a first predicted value corresponding to the positive sample and a second predicted value corresponding to the negative sample;
calculating a loss function based on the first predicted value corresponding to the positive sample, the second predicted value corresponding to the negative sample, and a relevance partial order between the positive sample image and the negative sample image; and
updating, along a direction reverse to a direction of minimizing the loss function, weighted parameters of layers in the original deep neural network.

15. The apparatus according to claim 14, wherein the image data comprises: image associated text data, image content data and image associated characteristic data;
wherein the image associated characteristic data comprises: a click query corresponding to the image, and/or a quality characteristic parameter of the image.

16. The apparatus according to claim 15, wherein the training a pre-constructed original deep neural network by using a training sample comprises:
returning to execute the operation of inputting the training sample to the original deep neural network, till achieving a preset training termination condition.

17. The apparatus according to claim 16, wherein the inputting the training query, image data corresponding to the positive sample and image data corresponding to the negative sample image to the original deep neural network, and acquiring, from the original deep neural network, a first predicted value corresponding to the positive sample and a second predicted value corresponding to the negative sample comprise:
inputting the training query and image data corresponding to the positive sample image to a first network with a structure identical to that of the original deep neural network, and acquiring a first predicted value output by the first network and
inputting the training query and image data corresponding to the negative sample image to a second network with a structure identical to that of the first network, and acquiring a second predicted value output by the second network; and the calculating a loss function based on the first predicted value corresponding to the positive sample, and the second predicted value corresponding to the negative sample, and updating, along a direction reverse to a direction of minimizing the loss function, weighted parameters of layers in the original deep neural network comprises:

calculating a loss function according to the first predicted value, the second predicted value, and a relevance partial order between the positive sample image and the negative sample image; and updating, along a direction reverse to a direction of minimizing the loss function, weighted parameters of layers in the first network and the second network layer-by-layer by using a set weight updating algorithm.

18. The apparatus according to claim 17, wherein the selecting a set number of training samples comprises:

summarizing image click information corresponding to a same query sample according to image click logs of search users, wherein the query sample comprises: a single query or at least two queries meeting a set similarity threshold condition;

generating a positive image sample set and a negative image sample set corresponding to the query sample according to the summarized image click information; and selecting a set number of query samples as the training queries, and generating positive-negative training pairs corresponding to the training queries respectively according to positive image sample sets and negative image sample sets corresponding to the training queries respectively, to serve as the training samples.

* * * * *